United States Patent [19]

Janney et al.

[11] Patent Number: 5,028,362
[45] Date of Patent: Jul. 2, 1991

[54] METHOD FOR MOLDING CERAMIC POWDERS USING A WATER-BASED GEL CASTING

[75] Inventors: Mark A. Janney, Knoxville, Tenn.; Ogbemi O. Omatete, Lagos, Nigeria

[73] Assignee: Martin Marietta Energy Systems, Inc., Oak Ridge, Tenn.

[21] Appl. No.: 434,624

[22] Filed: Nov. 13, 1989

Related U.S. Application Data

[63] Continuation of Ser. No. 207,813, Jun. 17, 1988, abandoned.

[51] Int. Cl.$^5$ ............................................. C04B 35/64
[52] U.S. Cl. ...................................... 264/25; 264/63; 264/109; 264/328.2; 264/328.18; 501/1
[58] Field of Search .................. 264/63, 109, 328.2, 264/328.18, 2 S; 501/1; 524/813, 821, 827, 828, 829

[56] References Cited

U.S. PATENT DOCUMENTS

| | | | |
|---|---|---|---|
| 2,939,199 | 6/1960 | Strivens | 264/63 |
| 3,351,688 | 11/1967 | Kingery | 264/63 |
| 3,423,358 | 1/1969 | Burke | 524/80 |
| 3,998,917 | 12/1976 | Adelman | 264/63 |
| 4,011,291 | 3/1977 | Curry | 264/56 |
| 4,113,480 | 9/1978 | Rivers | 264/63 |
| 4,132,564 | 1/1979 | Burke | 524/827 |
| 4,144,207 | 3/1979 | Ohnsong | 264/56 |
| 4,197,118 | 4/1980 | Wiech | 264/63 |
| 4,460,527 | 7/1984 | Kato | 264/56 |
| 4,478,790 | 10/1984 | Huther et al. | 419/54 |
| 4,677,082 | 6/1987 | Alford et al. | 501/1 |
| 4,734,237 | 3/1988 | Fanelli et al. | 264/63 |
| 4,906,424 | 3/1990 | Hughes et al. | 264/63 |

FOREIGN PATENT DOCUMENTS

220666  10/1984  Japan .

OTHER PUBLICATIONS

Cullen, F. M. et al., Forming Precision Shapes From Powdered Materials, IBM Technical Disclosure Bulletin, vol. 14, No. 10, Mar. 1972.

*Primary Examiner*—James Derrington
*Attorney, Agent, or Firm*—J. Donald Griffin; Ivan L. Ericson

[57] ABSTRACT

A method for molding ceramic powders comprises forming a slurry mixture including ceramic powder, a dispersant, and a monomer solution. The monomer solution includes at least one monofunctional monomer and at least one difunctional monomer, a free-radical initiator, and a aqueous solvent. The slurry mixture is transferred to a mold, and the mold containing the slurry mixture is heated to polymerize and crosslink the monomer and form a firm polymer-solvent gel matrix. The solid product any be removed from the mold and heated to first remove the solvent and subsequently remove the polymer, whereafter the product may be sintered.

31 Claims, 2 Drawing Sheets

METHOD FOR MOLDING CERAMIC POWDERS USING A WATER-BASED GEL CASTING

The present application is a continuation in part of a previously filed co-pending application Ser. No. 07/158,485 now U.S. Pat. No. 4,894,194 issued Jan. 16, 1990, and relates to a method for molding ceramic powders. More particularly, the present invention relates to a method for molding ceramic powders wherein the ceramic powders are added to a monomer solution to form a slurry mixture which is formed into a solid, shaped product. The method is particularly adaptable for forming complex shaped bodies from the ceramic powders. The U.S. Government has rights in this invention pursuant to blanket purchase agreement No. DE-AB01-87GC20701.MOOO.

This application is a continuation of application Ser. No. 207,813 filed June 17, 1988, now abandoned.

BACKGROUND OF THE INVENTION

Methods for forming ceramic powders into complex shapes are desirable in many areas of technology. For example, such methods are required for producing advanced, high-temperature structural parts such as heat engine components, recuperators and the like from ceramic powders. Generally, two methods are presently known for forming ceramic powders into complex or intricately shaped parts. Specifically, one method comprises machining a green blank to the desired shape. However, this method has significant drawbacks in that the machining is time consuming, expensive, and in a practical sense, inapplicable to some complex or varied cross-sectional shapes, for example, turbine rotors. A second method for forming ceramic powders into complex or intricatley shaped parts comprises injection molding a composition which comprises the ceramic powder and a polymeric and/or wax-like binder as a vehicle for the ceramic powder.

For example, the Strivens U.S. Pat. No. 2,939,199 discloses a method of forming articles from ceramic powders wherein the ceramic powders are mixed with a vehicle comprising a thermosetting material and a plasticizer, and the resultant mixture is injection molded into a mold of a desired shape and heated to cure the thermosetting component. The vehicle is then removed from the molded part by low pressure distillation or by solvent extraction. A similar method is disclosed in the Kingery et al U.S. Pat. No. 3,351,688 wherein the ceramic powder is mixed with a binder such as paraffin at a temperature where the binder is liquid, and the resulting mixture is cast into a mold of the desired shape. The binder is permitted to solidify so that a green piece is formed having a uniform density. Use of a paraffin wax binder for molding ceramic powders into desired shapes is also disclosed in the Curry U.S. Pat. No. 4,011,291 and the Ohnsorg U.S. Pat. No. 4,144,207. The Rivers U.S. Pat. No. 4,113,480 and the Wiech, Jr. U.S. Pat. No. 4,197,118 disclose additional methods for molding parts from metal powders by mixing the powders with binder materials and injection molding the resultant mixtures. Additional methods of interest which employ binder materials are also disclosed in the Huther et al U.S. Pat. No. 4,478,790 and the Kato U.S. Pat. No. 4,460,527.

The aforementioned injection molding techniques using various binder materials also have significant drawbacks. Generally, the binder removal times are unacceptably long, being up to a week or more in some instances, and binder removal often creates cracks or warpage in the molded parts. Additionally, after binder removal, the strength of the molded parts is relatively low whereby increased breakage of the parts occurs during subsequent handling. It is also difficult to provide molded parts having a large cross section, for example, parts greater than one inch in cross section, or having widely varying cross sections, that is, with both thick and thin regions, using the injection molding techniques.

Thus, the presently known methods for forming complex and intricately shaped parts from ceramic powders are disadvantageous in various respects. Moreover, a need exists for a method for molding ceramic powders into complex and intricately shaped parts, which method overcomes the disadvantages of the known techniques.

SUMMARY OF THE INVENTION

Accordingly, it is an object of the present invention to provide a method for molding ceramic powders into solid, shaped products. It is a related object of the present invention to provide a method for molding ceramic powders into complex and intricately shaped parts. It is an additional object of the invention to provide a method for molding ceramic powders into parts of large and/or variable cross sections. It is a further object of the invention to provide a method for molding ceramic powders into solid, shaped products using a binder vehicle, wherein the time necessary for binder removal is reduced.

These and additional objects are provided by the method for molding ceramic powders according to the present invention. Generally, the method of the present invention relates to the molding of ceramic powders into green products wherein a monomer solution is used as a binder vehicle and the controlled thermal polymerization of the monomer in solution serves as a setting mechanism. More specifically, the method according to the present invention comprises forming a slurry mixture including ceramic powder, a dispersant for the ceramic powder, and a monomer solution. The monomer solution includes at least one monofunctional monomer, at least one difunctional monomer, a free-radical initiator, and an aqueous solvent. The slurry mixture is transferred to a mold, and the mold containing the slurry mixture is heated at a temperature and for a time sufficient for the monomer to polymerize and crosslink to form a firm polymer-water gel matrix. The resultant green product is of exceptionally high strength and may be dried to remove the water in a relatively short time, for example, in several hours. After drying, the product may be further heated to remove the polymer and may subsequently be fired to sinter the product to a high density.

These and additional objects and advantages will be more fully understood in view of the following detailed description.

DETAILED DESCRIPTION

Figure 1:
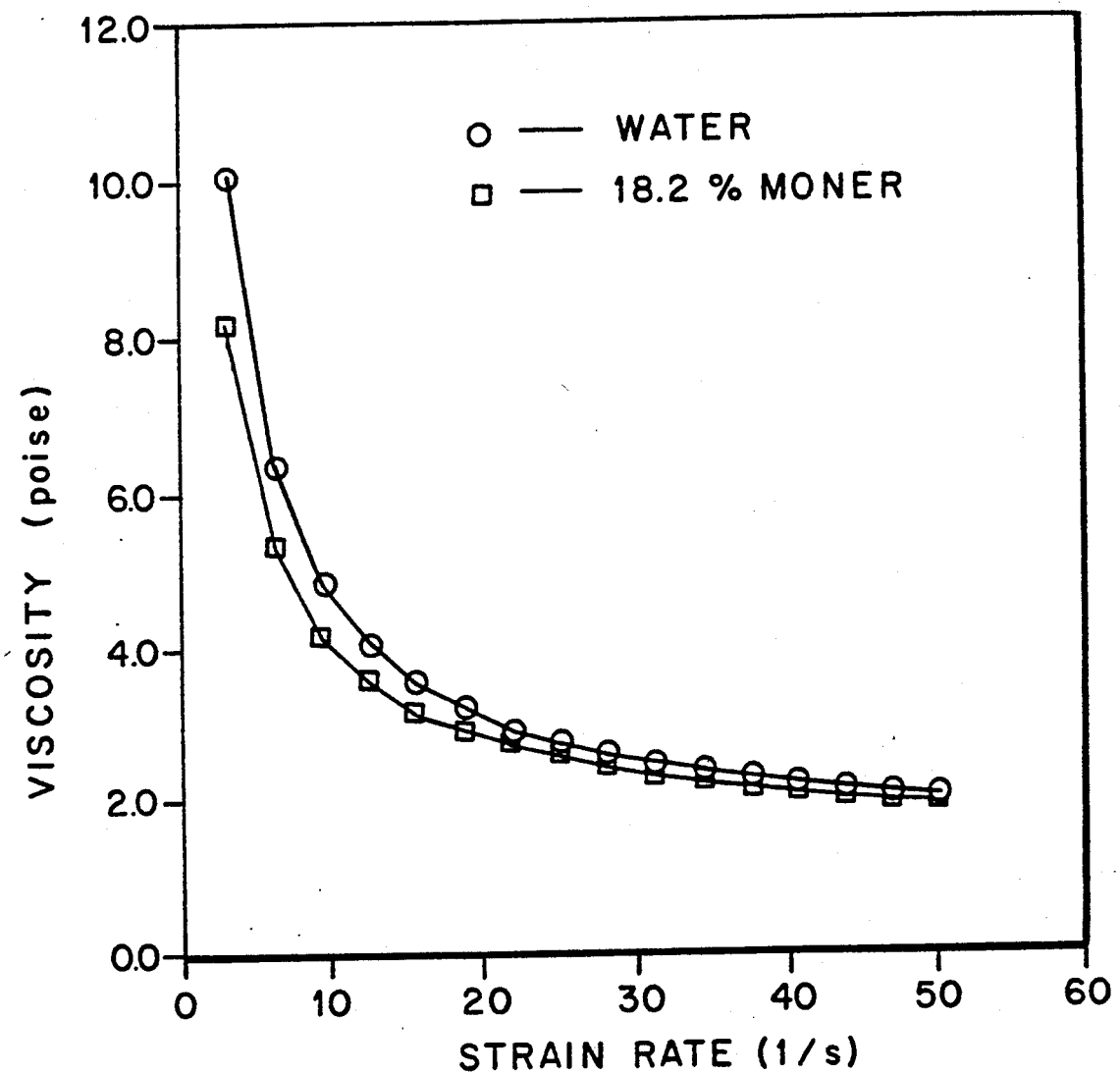
FIG. 1 is a rheogram of RC-152 slurry in water and in D-premix.

The present invention provides a method for molding ceramic powders into solid, shaped products. The solid, shaped products which result are in the green state whereby they may be further heated to remove the water and polymer components and then sintered at high temperatures to provide high density products. The method of the present invention is particularly suited for forming solid parts of complex or intricate shapes and/or of large or varied cross sections. Ceramic powders suitable for use in the methods of the present invention include, but are not limited to, alumina, fused silica, magnesia, zirconia, spinels, mullite, glass frits, tungsten carbide, silicon carbide, boron nitride, silicon nitride, and mixtures thereof.

In accordance with an important feature of the method of the present invention, the ceramic powder is mixed with dispersant for the powder and a monomer solution to form a slurry mixture. The monomer solution provides a low viscosity vehicle for the ceramic powder. Additionally, when heated, the monomer solution polymerizes and crosslinks to form a firm, strong polymer-solvent gel matrix. The gel matrix immobilizes the ceramic powder in the desired shape of the mold in which the slurry mixture is heated. The resultant "green" product exhibits exceptionally high strength.

Various dispersants for ceramic powders are known in the art and are appropriate for use in the present invention. Care should be exercised, however, is order to select a dispersant which does not interact with the components of the monomer solution, particularly the initiator or the solvent. A particular dispersant may be evaluated for suitability with a particular ceramic powder and a particular monomer solution by mixing small amounts of the respective components and judging the flow properties of the resultant mixture, whether the resultant mixture exhibits a notable yield point, and/or whether the mixture is dilatant. Preferred dispersants in water, include acrylic and methacrylic acid salts. Generally, the dispersant is used in a small amount, by volume, as compared with the amount, by volume, of the ceramic powder included in the mixture.

The monomer solution which is mixed with the ceramic powder and the dispersant to form the slurry mixture includes at least one monofunctional monomer, at least one difunctional monomer, a free-radical initiator compound and an aqueous solvent. Generally, a monofunctional monomer includes one functional group such as a vinyl or allyl group and a difunctional monomer includes two. In accordance with a preferred embodiment of the present invention, the monomer solution includes at least one monofunctional acrylamide monomer and at least one difunctional acrylamide monomer. Generally, the amount of monomer included in the monomer solution determines the degree of hardness of the resulting solid, shaped product. Generally, an exceptionally hard green product can be formed using no greater than about 20 volume percent of monomers in the monomer solution, and in a preferred embodiment, the monomer solution comprises from about 5 to about 20 volume percent monomer.

The use of an aqueous solvent is critical in this process therefore it is necessary to choose a monomer system that is soluble in water at low temperatures but polymerizes at increased temperatures.

The monomer solution further comprises a free-radical initiator compound for initiating the polymerization and crosslinking of the monomer when the slurry mixture is heated. Various thermally activated free-radical initiator compounds are known in the polymer art and are suitable for use in the method of the present invention. Preferred free radical initiator compounds include ammonium persulfate and potassium persulfate. The free-radical initiator is generally inactive at ambient temperatures so that the shelf-life of the monomer solution is relatively long. However, once the slurry mixture containing the monomer solution is heated, the reaction rate of the initiator compound is relatively high whereby polymerization and crosslinking of the monomers is easily and quickly achieved. The amount of initiator included in the monomer solutions is generally small as compared with the amount of monomer in accordance with conventional polymerization methods.

The ceramic powder, the dispersant and the monomer solution may be combined in any suitable manner. In a preferred embodiment, the slurry mixture is formed by dissolving the dispersant in the monomer solution and then adding the ceramic powder to the solution. The resultant slurry mixture is then transferred to a mold, and the mold containing the slurry mixture is heated at a temperature and for a time sufficient for the monomer to polymerize and crosslink to form a firm polymer-solvent gel matrix. Although the exact temperature at which polymerization and crosslinking occurs depends on the particular free-radical initiator compound and the particular multifunctional monomers which are included in the monomer solution, generally the temperature should be greater than about 25° C., and preferably in the range of about 25° C. to 80° C. Similarly, the time necessary to form a firm polymer-solvent gel matrix is dependent on the particular monomer, solvent and free-radical initiator compound. Generally, the mold containing the slurry mixture should be heated for at least 10 minutes and preferably is heated for a period of from about 10 to about 120 minutes in order to polymerize and crosslink the monomer and form the firm polymer-solvent gel matrix. After heating, the resultant shaped, solid product may be cooled to ambient temperature and removed from the mold. The product is in a wet, green condition in that it contains solvent and is in the unsintered form. Wet, green products have exhibited extreme strength and toughness.

The wet, green product may subsequently be heated in order to substantially remove the water and provide a dry product. Although the specific temperature and time necessary for drying the product depends on the specific ceramic powder and monomer solution employed, generally drying may be effected by heating at a temperature greater than about 30° C., preferably at approximately 40° to 80° C., in an oven for a period greater than about 1 h, preferably for a period of from about 1 to about 6 hours. Thus, the drying time in the method of the invention is substantially reduced as compared with known methods. Additionally, the polymer may be substantially removed from the product by further heating at a higher temperature, for example, greater than about 300° C. Finally, the solid, shaped product may be sintered to form a high density body. Sintering temperatures for various ceramic powders are well known in the art. Alternatively, substantial removal of the polymer may be accomplished as a low-temperature step of the sintering process.

While injection molding is preferred for use in the method of the present invention, other molding techniques, including extrusion molding, may also be employed. Moreover, any conventional additives known in the ceramic processing arts, for example, mold release agents, may be included in the slurry mixtures for their known functions.

The following Example further demonstrates the method of the present invention.

EXAMPLE

Acrylamide (AM) and N,N'-methylenebisacrylamide (MBAM) were the monofunctional and difunctional monomers, respectively, in this system. Total monomer concentrations of 5 percent, 10 percent, 14.6 percent, 18.2 percent, respectively, were the standard premix solutions used in all the detailed investigations.

Water with a concentration varying from 81.8 to 95 percent was the only solvent. No co-solvent was necessary. The initiators were persulfates; potassium persulfate with a solubility of about 5 percent and ammonium persulfate, with solubility over 60 percent in water, were both used. The latter initiator was utilized preferentially in the experiments.

Table 1 shows the range of monomer concentrations used. The concentration of monofunctional AM varied from 4.8 to 18.0 weight percent and the concentration of difunctional MBAM varied from 0.2 to 0.6 weight percent for a total concentration of 5.0 to 18.2 weight percent.

Gelation can be accomplished under extremely varied conditions depending on whether an initiator alone was added, or an initiator and a catalyst. The catalyst used here is $N,N,N^1,N^1$-tetramethylene diamine (TEMED) available from Malinkrodt, Inc., Paris, KY. The rate of gelation depends on how much TEMED is added at a given temperature.

The following conditions for gelation of the premix solutions were investigated:

a. The premix solution without initiator did not gel even under autoclave conditions (130° C.). The acrylamide premix in essence, has infinite shelf-life even at elevated temperatures.

b. With the initiator $(NH_4)_2S_2O_8$ at concentrations of 0.5 percent or less, gelation occurred in a water bath at 60° C. or 80° C. within 5 minutes., likewise, gelation occurred in 10 to 40 seconds in a microwave oven depending on the power output.

c. The addition of the catalyst, TEMED, in small amount less than 0.1 percent of the total solution further extends the flexibility in the gelation conditions. Gels were formed at room temperature in minutes depending on how much catalyst was added.

The gelation process was highly exothermic. The gels were transparent and their strength increased with the total monomer concentration. The gels formed homogeneously throughout the solution with no observable gelation front. There was no phase separation. The gel, whether soft at low monomer concentration or firm at higher monomer concentration, retained its consistency without a solvent separating out.

The slurry was prepared using Darvan C, an ammonium polymethacrylate, available from R. T. Vanderbilt Co., Greenwich, Conn., and P-35, a polyacrylamide, available from American Cyanamid Co., Wayne, N.J., two dispersants common to ceramic processing. Up to 58 volume percent alumina (RC/52DBM, Reynolds Chem. Co., Bauxite, AR) could be mixed with the A, B, C, and D premixes to produce freely flowing slurries.

The gelcasting batch compositions were all made in the following ratio: 9 ml of premix solution to 1 gm of dispersant to 50 gm of RC-152 alumina, equivalent to a 55 volume percent solids loading. FIG. 1 shows the rheograms of a slurry made with premix D compared to an identical slurry where water replaced the premix solution. The rheograms for A, B, C, hie between the two. There is little discernable difference among the rheograms.

To gel the slurry the calculated amount of the initiator $(NH_4)_2S_2O_8$, was added to a measured quantity of the A, B, C, and 0 slurries. The slurries were thoroughly mixed, sonicated and deaired in a paddle mixer. Since all the slurries contained 55 volume percent solids, the polymer represents only 0.9 percent, 1.8 percent, 2.6 percent, 3.3 percent of the weight of alumina in A, B, C, and D green parts, respectively.

The same flexibility with gelation conditions of the premix solution is applicable to the slurry. With the initiator alone, the slurries were gelled successfully in waterbath at 60° C. or 80° C. within 30 minutes.

With the addition of the catalyst, TEMED, the gelling occurred at room temperature (22°±1° C.) in 10 minutes to an hour depending on both the amount of catalyst and the total monomer concentration. The higher the concentration, the shorter the gelation time. The quantity of the catalyst required to gel the slurry was two to three times that required for the premix solution. This is not unexpected as some of the catalyst may have been adsorbed onto the alumina surface. In all these cases, there was no phase separation. The slurry gelled to a single green part even in complex shapes like a turbine rotor.

The slurries were gelled in glass molds 15.9 mm in diameter by 19.1 mm high at room temperature by adding both initiator and catalyst to the slurry. The gelation was complete in all cases in less than an hour. No mold release was necessary.

Figure 2:
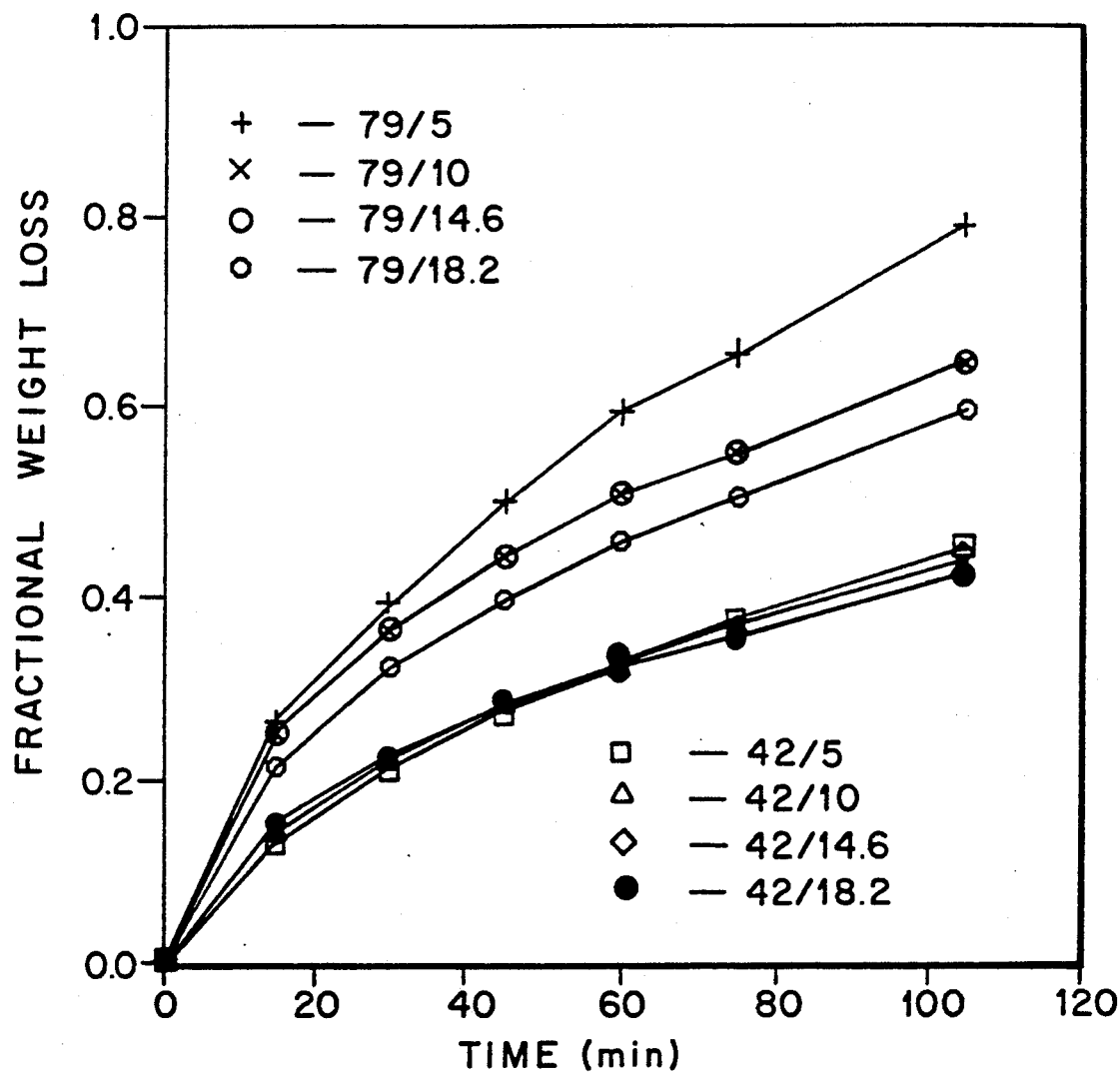
FIG. 2 is a graph of the drying rate of green parts at 42° C. and 79° C.

Two sets of formed parts of A, B, C, and D were selected for drying tests. The wet formed parts were smooth, without visible distortions and very resilient; A was most flexible, D was most rigid. These samples were dried in ovens set at 42°±1° C. and 79°±1° C. The weight loss with time was measured and is plotted in FIG. 2.

At 42° C., there is little difference in the rate of water loss from the gelled part at the four polymer concentrations; 5 percent, 10 percent, 14.6 percent, and 18.2 percent. This implies that at this low temperature, the water loss is limited by evaporation from the surface. At 79° C., on the other hand, the rate of water loss is highest for the lowest concentration of polymer and decrease with increasing polymer content. Water loss here is controlled by diffusion through the polymer gel.

As the samples dried, the top layers separated off as a thin (<0.5 nm) disc which left a clean smooth surface on the green part. The cracked layer corresponded to the surface of the slurry exposed to the atmosphere during gelation. The cracking is probably due to the inhibition of the polymerization process by oxygen in the air. Typically, molds would completely enclose the slurries, and if airtight would eliminate these cracks. The gelation process had been done in an inert atmosphere, such as $N_2$, which prevented the cracking.

TABLE I

| Sample Number | Acrylamide premix solutions | | |
|---|---|---|---|
| | Monomer* AM (%) | Crosslinking** agent MBAM (%) | $H_2O$ (%) |
| 137 | 10.0 | 1.0 | 89.0 |
| 138 | 8.0 | 1.2 | 90.8 |
| 139 | 4.0 | 1.6 | 94.4 |

TABLE I-continued

| Sample Number | Acrylamide premix solutions | | |
|---|---|---|---|
| | Monomer* AM (%) | Crosslinking** agent MBAM (%) | H₂O (%) |
| 140 | 14.0 | 0.6 | 85.4 |
| 152-A | 4.8 | 0.2 | 95.0 |
| 153-B | 9.6 | 0.4 | 90.0 |
| 154-C | 14.0 | 0.6 | 85.4 |
| 155-D | 18.0 | 0.2 | 81.8 |

*AM-Acrylamide from BRL, Bethesda Research Labs, Gaithersburg, MD.
**MBAM = N,N' methalenebisacrylamide from BRL, Bethesda Research Labs, Gaithersburg, MD.

The preceding example is set forth to illustrate specific embodiments of the invention and is not intended to limit the scope of the methods or compositions of the present invention. Additional embodiments and advantages within the scope of the claimed invention will be apparent to one of ordinary skill in the art.

The acrylamide gelcasting technique represents a major advance in ceramic processing. It is a generic system and is not dependent on the particular composition of the ceramic powder. Also, it represents a very small departure from traditional ceramic processing in its application. Slurries can be made with traditional processing equipment such as high speed dispersers or ball mills. The acrylamide and bisacrylamide monomers simply substitute for polyvinyl alcohol or other binders and actually reduce the relative viscosity of the system as compared to the polyvinyl alcohol-containing systems. Molds for gelcasting can be made of virtually any material including glass, metals, plastics, or waxes. The gelation conditions can be varied from several minutes to hours and from ambient to elevated temperatures. The consistency of the as-formed, wet parts can likewise be varied from soft to firm depending on the requirements of a particular process. Thus the aqueous gelcasting system represents a very flexible engineering process for forming ceramics.

We claim:

1. A method for molding ceramic powders, to form a solid shaped product comprising:
    (a) forming a slurry mixture comprising ceramic powder, a dispersant for said powder, and a monomer solution including at least one water soluble monofunctional monomer and at least one water soluble difunctional monomer, the functional group of said monofunctional and difunctional monomers selected from vinyl and allyl groups, a free radical initiator compound and an aqueous solvent;
    (b) transferring said slurry mixture to a mold; and
    (c) heating said mold containing said slurry mixture at a temperature and for a time sufficient for said monomers to polymerize and crosslink to form a firm polymer-solvent gel matrix, whereby said slurry mixture is formed into a solid, shaped product.

2. A method as defined by claim 1, comprising the additional steps of;
    (a) removing said solid, shaped product from said mold; and
    (b) heating said solid, shaped product at a temperature and for a time sufficient to substantially remove said aqueous solvent from said product.

3. A method as defined by claim 2, comprising the additional step of further heating said solid, shaped product, after said removal of said aqueous solvent, at a temperature and for a time sufficient to substantially remove said polymer from said solid, shaped product.

4. A method as defined by claim 3, comprising the additional step, after said polymer removal step, of sintering said solid, shaped product to form a high density product.

5. A method as defined by claim 1, wherein the monomer solution comprises from about 5 to about 20 volume percent monomers.

6. A method for molding ceramic powders to form a solid shaped product comprising:
    (a) forming a slurry mixture comprising ceramic powder, a monomer solution including at least one monofunctional monomer and at least one difunctional monomer wherein said monofunctional monomer is acrylamide and said difunctional monomer is N,N'methylenebisacrylamide, a persulfate free-radical initiator, a dispersant selected from the group consisting of acrylic and methacrylic acid salts, and an aqueous solvent;
    (b) transferring said slurry mixture into a mold; and
    (c) heating said mold containing said slurry mixture at a temperature and for a time sufficient for said monofunctional and said difunctional monomers to polymerize and crosslink to form a firm polymer-solvent gel matrix, whereby said slurry mixture is formed into a solid, shaped product.

7. A method as defined by claim 6 wherein said persulfate is selected from the group consisting of ammonium persulfate and potassium persulfate.

8. A method as defined by claim 8 wherein said slurry further comprises a catalyst.

9. A method as defined by claim 8 wherein said catalyst is $N,N,N^1, N^1$, - tetramethylene diamine.

10. A method as defined by claim 1, wherein said ceramic powder is selected from the group consisting of alumina, fused silica, magnesia, zirconia, spinels, mullite, glass frits, tungsten carbide, silicon carbide, boron nitride and silicon nitride powders, and mixtures thereof.

11. A method as defined by claim 1, wherein said mold containing said slurry mixture is heated at a temperature greater than about 25° C. for at least 5 minutes in order to polymerize and crosslink said water soluble monofunctional and water soluble difunctional monomers and form a firm polymer-solvent gel matrix.

12. A method as defined by claim 11, wherein said mold containing said slurry mixture is heated at a temperature from about 25° C. to about 80° C. for a period of from about 5 to about 120 minutes in order to polymerize and crosslink said monomers and form a firm polymer-solvent gel matrix.

13. A method as defined in claim 9, wherein said mold containing said slurry mixture is maintained at a temperature from about 0° C. to about 25° C. for a period of from about 5 to about 240 minutes in order to polymerize and crosslink said monomers and form a firm polymer-solvent gel matrix.

14. A method as defined by claim 1, wherein said solid, shaped product is heated at a temperature greater than about 30° C. for a period greater than about 1 hour to substantially remove said aqueous solvent from said product.

15. A method as defined by claim 14, wherein said solid, shaped product is heated at a temperature greater than about 30° C. for a period of from about 1 to about 10 hours to substantially remove said aqueous solvent from said product.

16. A method as defined by claim 3, wherein said solid, shaped product is heated at a temperature greater than about 300° C. and for a time sufficient to substantially remove said polymer from said product.

17. A method as defined in claim 1 wherein said slurry mixture is maintained in an inert atmosphere during said heating step to form said polymer-solvent gel matrix.

18. A method for molding ceramic powders to form a high density shaped ceramic object, comprising the steps:
(a) preparing a slurry mixture comprising ceramic powder, a dispersant for said powder, and a monomer solution including at least acrylamide, N,N'-methylenebisacrylamide, a persulfate and an aqueous solvent;
(b) transferring said slurry mixture to a mold;
(c) maintaining said mold containing said slurry mixture in an inert atmosphere at a temperature and for a time sufficient for said monomers of said monomer solution to polymerize and crosslink to form a firm polymer-solvent gel matrix, whereby said slurry mixture is formed into a solid, shaped product;
(d) removing said solid, shaped product from said mold;
(e) heating said removed solid, shaped product at a temperature greater than about 30 degrees C. for a period greater than about 1 hour to substantially remove said aqueous solvent from said product;
(f) further heating said solid, shaped product at a temperature greater than about 300 degrees C. and for a time sufficient to substantially remove said polymer from said shaped product; and
(g) sintering said shaped product at a temperature sufficient to form said high density shaped ceramic object.

19. A method as defined by claim 18 wherein said heating steps are carried out using microwave heating.

20. A method as defined by claim 1 wherein said water soluble monofunctional monomer is acrylamide, said water soluble difunctional monomer is N,N'-methylenebisacrylamide, said free-radical initiator is a persulfate and said dispersant is selected from the group consisting of acrylic and methacrylic acid salts.

21. A method as defined by claim 20 wherein said persulfate is selected from the group consisting of ammonium persulfate and potassium persulfate.

22. A method as defined by claim 20 wherein said slurry further comprises a catalyst.

23. A method as defined by claim 22 wherein said catalyst is N,N,N',N'-tetramethylene diamine.

24. A method as defined by claim 6, wherein said mold containing said slurry mixture is heated at a temperature greater than about 25° C. for at least 5 minutes in order to polymerize and crosslink said monomers and form a firm polymer-solvent gel matrix.

25. A method as defined by claim 24, wherein said mold containing said slurry mixture is heated at a temperature from about 25° C. to about 80° C. for a period of from about 5 to about 120 minutes in order to polymerize and crosslink said monofunctional and said difunctional monomers and form a firm polymer-solvent gel matrix.

26. A method as defined by claim 6, comprising the additional steps of:
(a) removing said solid, shaped product from said mold; and
(b) heating said solid, shaped product at a temperature and for a time sufficient to substantially remove said solvent from said product.

27. A method as defined by claim 26, comprising the additional steps of further heating said solid, shaped product at a temperature and for a time sufficient to substantially remove said polymer from said product.

28. A method as defined by claim 27, comprising the additional step of sintering said solid, shaped product to form a high density product.

29. A method as defined by claim 6, wherein said ceramic powder is selected from the group consisting of alumina, fused silica, magnesia, zirconia, spinels, mullite, glass frits, tungsten carbide, silicon carbide, boron nitride and silicon nitride powders, and mixtures thereof.

30. A method as defined in claim 18 wherein said slurry mixture further comprises a catalyst.

31. A method as defined in claim 30 wherein said catalyst N,N,N',N',-tetramethylene diamine.

* * * * *